United States Patent [19]
Wolfe et al.

[11] 3,934,417
[45] Jan. 27, 1976

[54] THERMAL RESPONSIVE DEVICE WITH AN ADSORBENT CARBONACEOUS MATERIAL

[75] Inventors: Denis G. Wolfe; Hugh J. Tyler, both of Santa Ana, Calif.; Wilbur F. Jackson, deceased, late of Rolling Hills, Calif.; by Linda A. Benton, trust administrator, Long Beach, Calif.

[73] Assignee: Robertshaw Controls Company, Richmond, Va.

[22] Filed: Oct. 12, 1973

[21] Appl. No.: 405,950

[52] U.S. Cl. .................. 60/516; 73/368.2; 252/421; 252/445; 264/29; 423/449
[51] Int. Cl.² ..................... F01B 19/02; G01K 5/32
[58] Field of Search ........... 73/368.2; 252/421, 445; 260/92.8 A; 423/449; 60/516; 264/29, 105

[56] References Cited
UNITED STATES PATENTS

| | | | |
|---|---|---|---|
| 2,868,017 | 1/1959 | Beard | 73/368.2 |
| 3,258,363 | 6/1966 | Lieb | 423/449 X |
| 3,410,141 | 11/1968 | Zurstadt | 73/368.2 |
| 3,516,791 | 6/1970 | Evans | 423/449 |
| 3,639,266 | 2/1972 | Battista | 252/421 |
| 3,766,783 | 10/1973 | Tortoso | 73/368.2 |
| 3,843,308 | 10/1974 | Graham et al. | 73/368.2 X |

OTHER PUBLICATIONS

Dacey, J. R. et al., *Adsorbtion on Saran Charcoal*, in *Trans. Faraday Soc.* Vol. 50, pp. 740–748 (1954).
Adams, L. B. et al. *Adsorbtion of Organic Vapours by Saran-Carbon Fibres and Powders*, in *Carbon* (1970), Vol. 8, pp. 761–772.

*Primary Examiner*—Donald O. Woodiel
*Assistant Examiner*—Frederick Shoon
*Attorney, Agent, or Firm*—Anthony A. O'Brien

[57] ABSTRACT

A thermal responsive device employs gas, such as a noble gas, with an adsorbent carbon material which is a decomposed carbonaceous compound, such as decomposed polyvinylidene chloride or decomposed polyvinylidene fluoride.

11 Claims, 4 Drawing Figures

THERMAL RESPONSIVE DEVICE WITH AN ADSORBENT CARBONACEOUS MATERIAL

BACKGROUND OF THE INVENTION

1. Field of the Invention

The invention relates to thermal responsive devices, and in particular, to thermal responsive devices employing gas adsorbent materials.

2. Description of the Prior Art

The prior art, as exemplified by U.S. Pat. Nos. 2,221,633, 2,426,663, 2,627,911, 2,787,130, and 3,410,141, contains many thermal responsive devices which have enclosed chambers containing an activated material, such as activated charcoal, with a gas charge, such as difluorodichloromethane, dimethyl ether, carbon dioxide, argon, nitrogen, trifluoromonochloromethane, or fluoromethane. Activated charcoal is made by eroding funnel-like pores or cavities in carbonized organic materials such as wood, coal, coconut husks, bones, etc. by a reactive material, such as steam, carbon dioxide or the like. While gases in activated-charcoal-containing devices exhibit some increase in volume or pressure change per degree of temperature change over devices containing only gas, attempts to manufacture such activated charcoal devices in quantities have generally met with failure; it has been impossible to predict or avoid large variations in volume or pressure change per degree temperature change in different batches of activated charcoal; the increase in volume or pressure change per degree temperature change was not sufficiently large to warrant the added manufacturing cost; and the activated charcoal devices were substantially deficient in volume or temperature change per degree temperature change compared to alternate devices, such as liquid-vapor or mercury expansion devices.

The prior art, as exemplified in U.S. Pat. Nos. 1,744,735, 3,258,363; 3,442,819; 3,516,791 and publication (USSR Academy of Sciences, M. M. Dubinin, "Thermal Treatment and Microporous Structure of Carbonaceous Adsorbents" *Proceedings of the Fifth Conference on Carbon*, Volume 1, 1962, pages 81–87), contains many adsorbent carbon materials including decomposed polyvinylidene chloride and polyvinylidene fluoride. Adsorbent carbon materials are widely used in removing contaminants, or the like, from gases or liquids. POlyvinylidene chloride and polyvinylidene fluoride, in particular, have been recognized for their "molecular sieve" property, that is, their ability to adsorb certain gaseous materials which have small molecular sizes while being incapable of adsorbing other gaseous materials which have larger molecular sizes.

SUMMARY OF THE INVENTION

The invention is summarized in that a thermal responsive device includes means forming an enclosed chamber; an adsorbent carbonaceous material in the chamber; a charge of gas in the chamber; and means responsive to gas pressure in the chamber; said adsorbent carbonaceous material formed from a compound containing both carbon and a non-carbon component by removing the non-carbon component to form a carbonaceous skeletal structure having cavities of sufficient size to receive and adsorb the gas.

An object of the invention is to construct a thermal responsive device which is safe and which exhibits improved volume or pressure response to changes in temperature.

Another object of the invention is to provide an adsorbent-containing gas-charged sensor which is reliable and can be dependably manufactured in large quantities.

A further object of the invention is to construct a thermal responsive device which can be used as a substitute for present mercury containing sensing devices.

An advantage of the invention is the lower sensitivity to ambient temperature variations in non-sensing portions of the sensor.

Another advantage is the lower internal gas pressure at room or storage temperature which lessens the stress that can cause leaks over extended periods of time.

An additional feature of the invention is the provision of a sensing bulb containing a monatomic gas and an adsorbent carbon material having cavities with substantially uniform width through out the depth of the cavities or cavities with substantially uniform inlets, large enough to receive substantial quantities of the monatomic gas but small enough to provide a substantially improved volume or pressure response to changes in temperature.

DESCRIPTION OF THE PREFERRED EMBODIMENT

Figure 1:
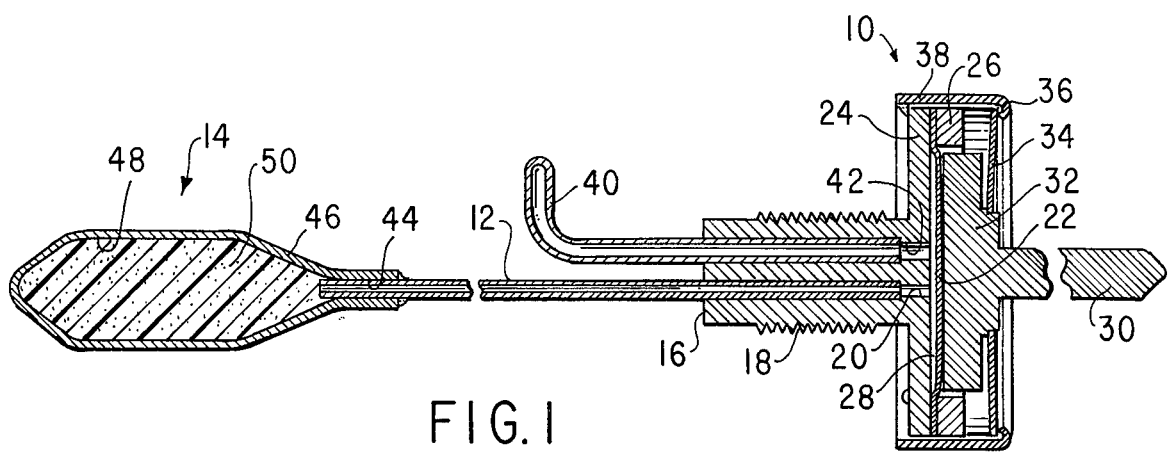
FIG. 1 is a cross section view of a thermal responsive device in accordance with the invention.

As illustrated in FIG. 1, the invention is embodied in a thermal responsive device having a gas pressure responsive member generally indicated at 10 connected by a capillary or tube 12 to a temperature sensing bulb indicated generally at 14.

The gas pressure responsive member 10 has a support member 16 with a threaded portion 18 having a bore 20 in which one end of the tube 12 is suitably secured. A flexible diaphragm 22 is secured to the periphery of the face of a flange portion 24 of the member 16 by suitable means such as an annular spacer 26 and a seam weld to form a chamber 28 which communicates with the bore 20. The flexible diaphragm 22 is made from a suitable flexible material such as a 0.127 millimeter (0.005 inch) thick sheet of 301 stainless steel. A plunger 30 has a head portion 32 which is biased against the diaphragm 22 by a Belleville spring 34 held by a lip 36 of a tubular retainer 38 which is secured by welds to the flange portion 24 of the support member 16. The Belleville spring is shaped to constantly bias, not necessarily with a constant force, the plunger 30 against the diaphragm 22. An evacuation and charging tube 40 is suitably secured within a bore 42 communicating with the chamber 22.

The other end of the tube 12 is suitably secured such as by welding in an opening 44 of the bulb 14. The bulb 14 has a thermal conductive wall 46, such as a metal wall forming an enclosed chamber 48 communicating with the tube 12. For high temperature application or flame sensing, the bulb 14 and tube 12 can be made of Incoloy 800, Stainless Steel 304, or any other suitable high temperature material. The bulb 14 contains granules 50 of a porous carbonaceous material which has gas adsorbent properties. The chambers 28 and 48, and the tubes 12 and 40 contain a charge or quantity of gas, such as a noble gas selected from helium, neon, argon, krypton or xenon. Other gases which are non-reactive at the temperature of use can be employed so long as the gases have a molecular size which is readily adsorbed by the carbonaceous material 50. The particular gas used is selected by considering the cost and the desired pressure or volume change per degree temperature change, which pressure or volume change increases directly with the molecular weight of the gas; for example, xenon produces a greater pressure or volume change per degree temperature change than krypton.

The adsorbent carbon material 50 is made from granules of a compound containing carbon and a non-carbon component by removing the non-carbon component to leave a carbonaceous skeletal structure having cavities of sufficient size to receive and adsorb substantial quantities of the gas. Preferably, the compound is a synthetic polymer having volatile components such as hydrogen and a halogen, which can be driven off by heat leaving a carbonaceous skeletal structure which is porous. Suitable synthetic polymers are polyvinylidene chloride or polyvinylidene fluoride. Polyvinylidene chloride or polyvinylidene fluoride are formed into adsorbent carbons by carbonizing or pyrolytic decomposition in a purifying atmosphere, such as a vacuum or a purging flow of inert gas. Carbonizing is performed by heating to a temperature less than the melting point but greater than the temperature at which decomposition can be initially observed. For polyvinylidene chloride, carbonizing is performed at a temperature in the range from 138°C (280°F) to 177°C (350°F). The duration of heating required for complete carbonization of the synthetic polymer is dependent upon the size of the granules of the synthetic polymer and the temperature employed. Along with utilizing a predetermined temperature and duration for a certain size of granular synthetic polymer, observation of a reduction in gas being removed by a vacuum system or the gas being evolved from the granular material are methods of determining complete carbonization. During carbonization, the non-carbon components, that is hydrogen and the halogen, are volatilized and removed from the synthetic polymer structure leaving a carbon skeletal structure which is highly porous. After the synthetic polymer is carbonized, the carbonized polymer can be subjected to a higher temperature up to about 1510°C (2750°F) to outgas hydrogen and halogen gases which may have been adsorbed. Outgassing can be completed in a short duration, for example 15 minutes.

In manufacture of the thermal responsive device, the granular adsorbent carbon material 50 is placed within the bulb 14. The bulb 14, the tubes 12 and 40, the support member 16, the diaphragm 22, the spacer 26, the plunger 30, the spring 34, and the retainer 38 are assembled. The unsecured end of the tube 40 is open and is connected to an evacuating and gas charging apparatus. The bulb 14 is heated to outgas air adsorbed by the carbon material 50 while it is evacuated. The temperature of the bulb is then adjusted to a predetermined setting-temperature or a critical temperature at which a control or other device is to be actuated. Then the charge of gas is supplied to the tube 40 until the desired operating pressure or volume as monitored by movement or force of the plunger 30 is reached. At this point the open end of the tube 40 is sealed and the thermal responsive device is completed. The thermal responsive device can then be assembled for use in a variety of temperature controlled or responsive apparatus, such as temperature indicators, temperature responsive values and switches, and the like.

In operation of the thermal responsive device, the pressure and/or volume of the gas in the chambers 50 and 28, and the tubes 12 and 40 changes with temperature changes of the bulb 14. The pressure and/or volume changes of the gas in the chamber 28 results in movement or a change in force exerted by the diaphragm 22 and the plunger 30. This movement or change in force is utilized to control the apparatus in which the thermal responsive device is employed.

It has been discovered that the volume or pressure change per degree of temperature change are substantially greater over a wider range of temperatures for the thermal responsive device containing the carbonized synthetic polymer than for thermal responsive devices containing activated charcoal; such increase is not apparent from the prior art. Carbonized polyvinylidene chloride and polyvinylidene fluoride have been mainly characterized for their inability or deficiencies in adsorbing certain materials.

The change in pressure or volume is due to (1) adsorption or desorption of gas in the carbon material 50 and (2) the increase or decrease in pressure or volume of non-adsorbed gas due to a change in temperature or kinetic energy. The effects of ambient temperature change of the tubes 12 and 40, and the pressure responsive member 10 on the gas pressure or volume is substantially minimal where compared to the change in gas pressure or volume due to temperature change of the bulb 14; this results from the greatly increased pressure or volume change per degree of temperature change attributable to the adsorption and desorption of gas in the carbon material 50 which is made from a carbonized polymer.

In a thermal responsive device containing carbonized polyvinlidene chloride and krypton with an operating temperature of 316°C (600°F), an internal pressure of $16.2 \times 10^6$ dynes per square centimeter (235 pounds per square inch) and a heated to non-heated volume ratio of 10 to 1, the ability of the gas charge to do work is increased approximately 3.4 times that of a straight gas charge; while in a thermal responsive device containing activated charcoal with similar conditions, the ability of gas charge to do work is increased only about 1.5 times a straight gas charge. The large increase in thermal response or ability to do work of the carbonized synthetic polymer makes possible a practical adsorbent-carbon-containing temperature responsive device for use in a number of applications where devices utilizing vapor expansion from a liquid were the only fluid expansion devices capable of performing the desired function; increasing the sensing bulb size or the heated to non-heated volume ratio above 10 to 1 increases the ability to do work by only a small amount.

Figure 2:
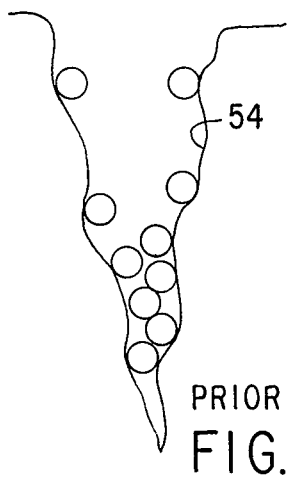
FIG. 2 is a schematic of a pore formed in adsorbent carbon materials of prior art thermal resonsive devices.
Figure 3:
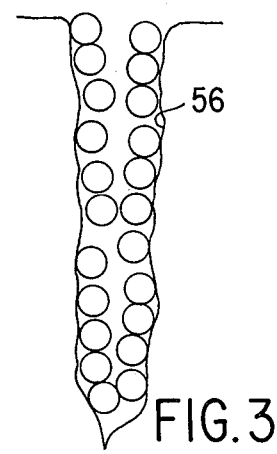
FIG. 3 is a schematic of a pore in adsorbent material in the thermal responsive device shown in FIG. 1.

While the structural distinctions or properties of the carbonized synthetic polymer that cause its improved pressure volume change per degree temperature change can not be visually observed, various theories of the structural properties have been formulated by observation of other properties of the carbonized polymer. As shown in FIG. 2, activated carbons, such as activated charcoal, have pores or cavities 54 which are funnel-shaped or cone-shaped; whereas the carbonized synthetic polymer, as shown in FIG. 3, has cavities 56 which are slit-like or have substantial portions with relatively uniform width through out the depth of such portions. In making activated carbons, the eroding or activation process produces the funnel-shaped cavities; activating or eroding carbonized synthetic polymer with steam or the like will substantially deteriate and eventually destroy the improved volume or pressure change per degree temperature change of adsorbed gas in the carbonized synthetic polymer. The slit-like cavities 56 of the carbonized synthetic polymer are believed to result from the production of the cavities by removing or volatilizing the non-carbon components of the polymer while in a solid state.

It is also therorized that the width or diameter of the cavities or pores or their inlets, substantially effects the adsorbent properties of the carbon material. Using a Kelvin method of measuring pore size it has been determined that the pore size of carbonized polyvinylidene chloride ranges from 10 to 15 angstroms in width or diameter, while the diameter of pores in activated charcoal ranges from 15 to 200 angstroms with an average pore size much larger than 17 angstroms. An average cavity or inlet width in the range generally from about 9.2 angstroms to about 17 angstroms and preferrably from 12 to 15 angstroms in the carbonized synthetic polymer produces the improved volume or pressure change per degree temperature change. The cavity size of carbonized polymer can be reduced by heating in the range from 1510°C (2750°F) to 2205°C (4000°F). A brief activation with steam, carbon dioxide, or the like can be employed to enlarge the cavities.

Van der Waal's forces are theorized as being the main attractive force resulting in adsorption of gas molecules. The width of the cavities in the carbonized synthetic polymer being slightly larger than two diameters of the monatomic molecules of noble gas results in increased Van der Waal's forces within the cavities due to the closeness of several crystalline faces, carbon lattice structures, or walls in the cavities 56. Also, the Van der Waal's forces are generally greater for larger molecules which results in the heavier monatomic gases having a greater volume or pressure change per degree of temperature change than the lighter monatomic gases. Since Van der Waal's forces are attributed to weak dipoles, the carbon lattice arrangement produced by the carbonization of a synthetic polymer may have a stronger dipole than other atomic crystalline structures. The apparent Van der Waal's forces, as judged by internal pressure change per degree of temperature change of the carbonized synthetic polymer are approximately 1.8 times that of activated carbon.

Another structural distinction is found in the number of cavities in a unit weight of the adsorbent carbon material. Carbonized polyvinylidene chloride as measured by a BET method has a surface area of 1200 square meters per gram whereas activated charcoal has a surface area in the range from 500 to 1000 square meters per gram. The surface area is believed to be proportional to the number of pores. The formation of pores or cavities by removing the non-carbon components of a carbonaceous compound leaving a skeletal carbon structure is believed to result in a more porous structure than that formed by eroding or activating cavities in a carbon material.

One advantage of using a noble gas is that the noble gases will maintain their pressure for longer durations of time than more reactive gases. It has been observed there is substantially less diffusion of the noble gases into metal than for more reactive gases; thus the use of a noble gas results in less leakage of gas from the chamber 50 by diffusion through the wall 46 producing a longer lasting and more reliable temperature responsive device.

Another advantage of using an adsorbent unactivated carbonized compound as opposed to using an activated carbon is the uniformity that can be achieved in manufacturing thermal-responsive devices. Different batches of carbonized polyvinylidene chloride produced in different process runs have substantially identical adsorption properties, whereas different batches of activated charcoal vary widely in adsorption properties; thus the thermal responsive device employing an unactivated carbonized compound makes possible the practicle manufacture of large quantities of dependable thermal responsive devices which utilize adsorbent carbon and gas.

As an example of the manufacture of a thermal responsive device, SARAN 113, a copolymer including a substantial portion (approximately 90%) of polyvinylidene chloride, purchased from the DOW Chemical Company, Midland, Mich, and having a particle size distribution in the range from 100 to 500 microns is heated within a vacuum oven at about 1000 microns of pressure at a temperature of about 160°C (320°F) for about 16 hours to completely carbonize the polyvinylidene chloride. After carbonization, temperature is gradually raised to about 900°C (1650°F) over a period of 8 hours. Then the vacuum oven is further evacuated to 250 microns at 1650°F for about 30 minutes to further outgas hydrogen and chloride gases from the carbonized synthetic polymer and complete the manufacture of a suitable adsorbent carbon.

Figure 4:
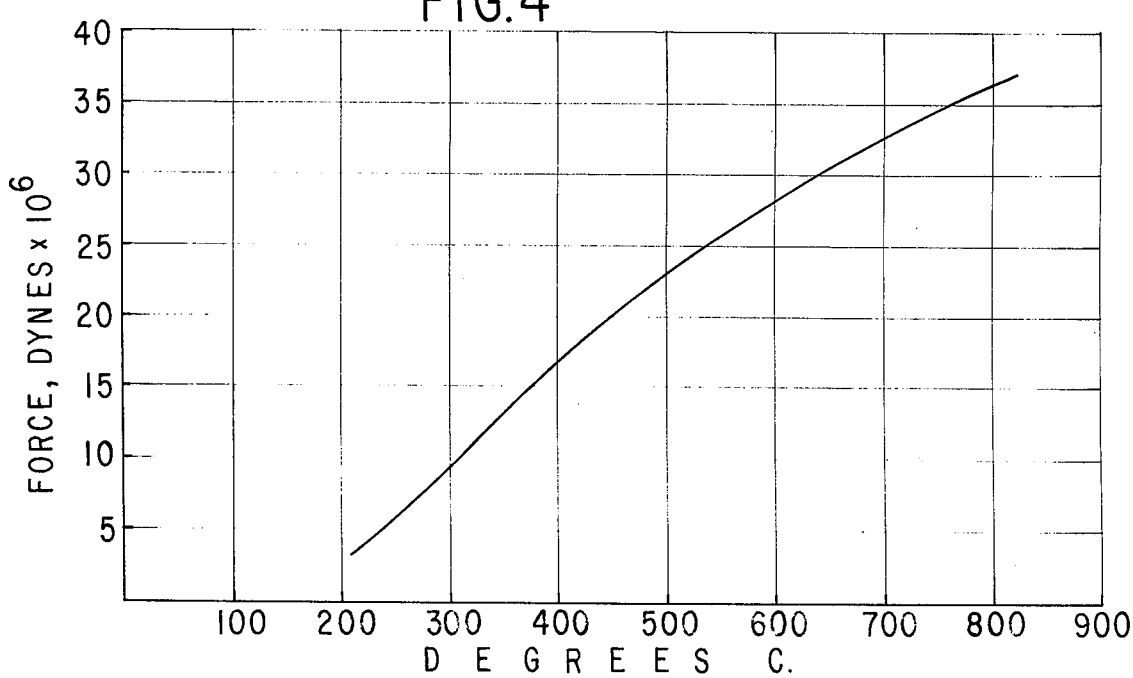
FIG. 4 is a graph with a curve of the force produced for different temperatures of the device of FIG. 1.

A measured quantity of the carbonized synthetic polymer is placed in the bulb 14 and the thermal responsive device is assembled as shown in FIG. 1 except that the free end of the tube 40 is open. The open end of the tube 40 is connected to an evacuation and charging apparatus. The bulb 14 is heated to about 815°C (1500°F) and evacuated until a vacuum gauge reads about 18 microns to outgas a large portion of the air adsorbed by the carbonized synthetic polymer. The end of the plunger 30 is engaged against a force measuring instrument with a force of about $10 \times 10^6$ dynes (22.5lb). After evacuation and outgassing, the temperature of the bulb 14 is reduced to about 371°C (700°F) with a vacuum guage pressure of about 16 microns. The evacuation and charging apparatus is then operated to supply a charge of krypton gas through the tube 40 until the force measured by the force measuring instrument is equal to $14.2 \times 10^6$ dynes (32 pounds). The open end of the tube 40 is then sealed to complete the pressure responsive device. FIG. 4 illustrates the force produced against a measuring instrument by the plunger 30 for different temperatures from 200°C to 800°C.

Since many variations, modifications and changes in detail may be made to the present embodiment, it is intended that all matter in the foregoing description and the accompanying drawings be interrupted as illustrative and not in a limiting sense.

What is claimed is:
1. A thermal responsive device comprising
   means forming an enclosed chamber;
   an adsorbent carbonaceous material in the chamber;

a charge of gas in the chamber; and means responsive to gas pressure in the chamber;

said adsorbent carbonaceous material being formed from a synthetic polymer selected from the group consisting of polyvinylidene chloride and polyvinylidene fluoride by removing the hydrogen and halogen components to form a carbonaceous skeletal structure having cavities; and said charge of gas including molecules which have widths smaller than the widths of the cavities so as to be readily adsorbed and desorbed in the cavities of the adsorbent carbonaceous material upon decrease and increase, respectively, of temperature.

2. A thermal responsive device as claimed in claim 1 wherein the adsorbent carbonaceous material has cavities with substantially uniform inlets in the skeletal structure of a size large enough to allow entrance and adsorption of monatomic gas in the cavities but small enough to retain substantial quantities of adsorbed gas, and the charge of gas includes a monatomic gas.

3. A thermal responsive device comprising means, including thermal conductive means, forming an enclosed chamber;

an adsorbent carbonaceous material in the chamber;

a charge of gas in the chamber; and means responsive to gas pressure in the chamber;

said adsorbent carbonaceous material having cavities which have an average width in the range from about 9.2 to 17 angstroms;

said gas charge including gas molecules having widths smaller than the average width of the cavities so as to be readily adsorbed and desorbed in the cavities upon decrease and increase, respectively, in temperature.

4. A thermal responsive device as claimed in claim 3 wherein the gas is a noble gas.

5. A thermal responsive device as claimed in claim 3 wherein the average width of the inlets of the cavities in the adsorbent carbon is within the range of about 12 angstroms to 15 angstroms.

6. A thermal responsive device comprising means, including thermal conductive means, forming an enclosed chamber;

an adsorbent carbonaceous material in the chamber;

a charge of gas in the chamber;

means responsive to gas pressure in the chamber;

said adsorbent carbonaceous material formed from a synthetic polymer including a material selected from the group consisting of polyvinylidene chloride and polyvinylidene fluoride, said adsorbent carbonaceous material formed by a process including the steps of subjecting the synthetic polymer to a purifying atmosphere and heating the synthetic polymer while subjected to the purifying atmosphere to a temperature above the decomposition temperature of the synthetic polymer but below the melting temperature of the synthetic polymer to form cavities at sites of volatilized components of sufficient size to receive molecules of the gas.

7. A thermal responsive device comprising means, including thermal conductive means, forming an enclosed chamber;

an adsorbent carbonaceous material in the chamber;

a charge of gas in the chamber; and means responsive to gas pressure in the chamber;

said adsorbent carbonaceous material being porous with cavities wherein a substantial majority of the cavities have substantially uniform widths in the range of about 9.2 to 17 angstroms throughout portions of the depths of the cavities; and said charge of gas including gas molecules having widths which are smaller than the uniform widths of the majority of cavities so as to be readily adsorbed and desorbed in the cavities upon decrease and increase, respectively, in temperature.

8. A thermal responsive device as claimed in claim 7 wherein the cavities have depths which are substantially greater than their widths.

9. A thermal responsive device as claimed in claim 8 wherein the gas is selected from helium, neon, argon, krypton and xenon.

10. A thermal responsive device as claimed in claim 7 wherein the average width of the cavities in the carbonaceous material is in the range of 12 to 15 angstroms.

11. A thermal responsive device comprising means, including a metal bulb, forming an enclosed chamber;

porous carbonaceous granules in the metal bulb, formed by substantially complete pyrolytic decomposition of synthetic polymer granules containing polyvinylidene chloride in a purifying atmosphere at a temperature in the range of about 138°C to 177°C;

a charge of gas in the chamber, selected from the group consisting of helium, neon, argon, krypton, and xenon; and expandable and retractable means responsive to the gas pressure in the chamber.

* * * * *